Dec. 17, 1968  R. PERSSON  3,417,200
PROCEDURE FOR WELDING METAL PIECES TO POROUS MATERIAL
AND DEVICE FOR CARRYING OUT THIS PROCEDURE
Filed Oct. 2, 1964
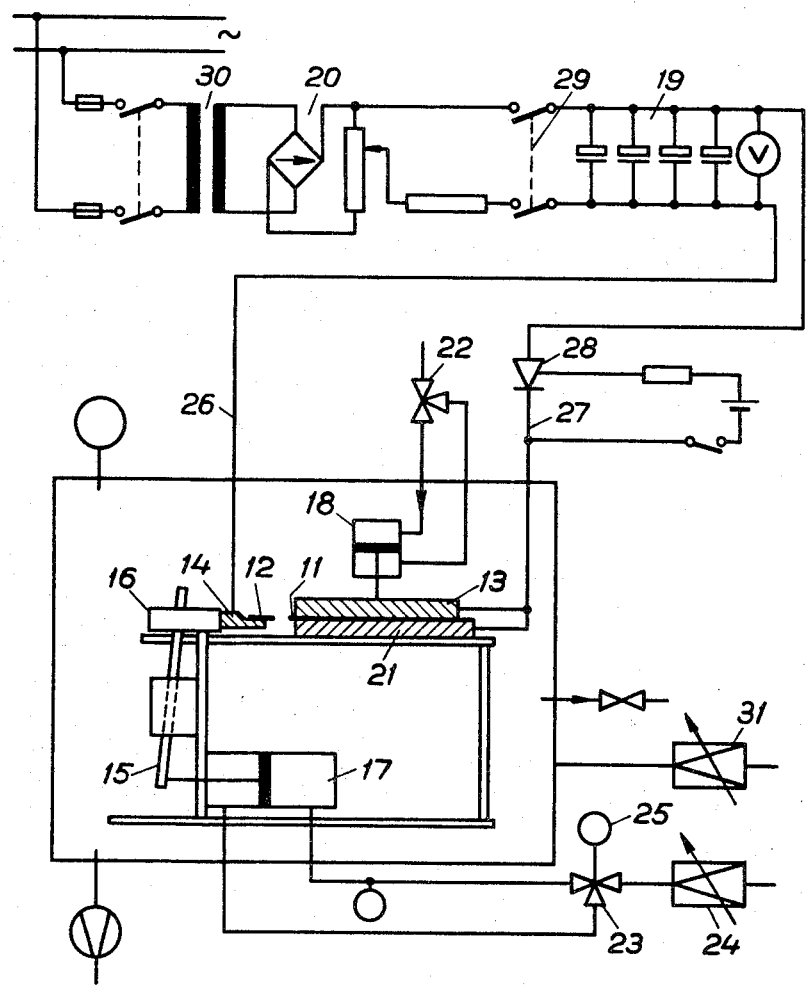
INVENTOR.
RUNE PERSSON
BY Bailey, Stephens

3,417,200
PROCEDURE FOR WELDING METAL PIECES TO POROUS MATERIAL AND DEVICE FOR CARRYING OUT THIS PROCEDURE
Rune Persson, Vasteras, Sweden, assignor to Allmänna Svenska Elektriska Aktiebolaget, Vasteras, Sweden, a corporation of Sweden
Filed Oct. 2, 1964, Ser. No. 401,102
Claims priority, application Sweden, Oct. 7, 1963, 10,944/63
5 Claims. (Cl. 219—113)

ABSTRACT OF THE DISCLOSURE

A method of welding fuel cell electrodes comprising nickel and other substances and having a porosity of at least 10% to metal pieces constituting conductors includes pressing the parts together with a uniform pressure and discharging a condenser quickly across the parts to be welded together.

---

The present invention relates among other things to a procedure for welding metal pieces to porous material, particularly current contacts to the porous electrodes in a fuel cell. By "porous material" we mean here a material with the relation total air spaces: volume being at least 10%, preferably at least 25%.

A fuel cell for generating electrical energy by a reaction between a continually supplied combustible substance, as for example hydrogen, and a continually supplied oxidising substance, as for example oxygen, air or halogen, can in its most simple form consist of a suitable liquid electrolyte and two porous (sintered) electrodes, of which one is arranged between the electrolyte and the combustible substance and the other between the electrolyte and the oxidising substance. In such fuel cells porous electrodes of nickel plus other metals such as aluminum and silver are used, the large porosity of their electrodes, about 40–45%, making them suitable for that purpose. Because of differences in the expansion coefficients of the alloy elements in the electrodes, they break easily however during welding of current and heat conductors of metal, which means that such conductors may not advantageously be welded to said electrodes by means of conventional welding methods such as spot or projection welding, or other electrical or tungsten welding methods. Because of the porosity of the electrodes soldering is not suitable. Previously with similar material electron-beam welding has been used, but that method is expensive.

In other connections the so-called condenser welding has been known, but because it is dangerous has not been used to any great extent. For example, in Welding Handbook, fourth edition, section two, pages 31.28, 31.29, 31.30 under the heading "Percussive Welding" condenser welding is described by using at least one condenser, either one with high capacitance and low voltage (LO–15 v. D.C.) or one with low capacitance and high voltage (3000–6000 v. D.C.). Electrical energy is stored in the condenser or the condensers and is discharged quickly while a pressure is applied during or immediately after the discharge over the object to be welded.

The invention provides a procedure by which said breakage risk is not present to any great extent and characterised in that said condenser welding method can be used for joining current and heat conductors of metal to the porous electrodes. According to the invention the metal piece and the porous material respectively are connected to each plate of at least one condenser and are joined together under a short discharge through the welding object during and/or successively followed by an evenly applied pressure upon the welding objects. The short duration of the welding, either made in air or in a controlled atmosphere, and high current density means that cracking is avoided and that good permanent welding even with wide current conductors can be produced directly on the electrode edge. The method is specially suitable in this case as the heat effect on the sintered basic material is so small that the risk of cracking is eliminated. The existing disadvantages with the previously used spot or projection or resistance welding methods have been eliminated and at the same time the expensive electron-beam welding has been overcome, which was used earlier and which is about 20 times more expensive than the procedure according to the invention. By means of the invention a thin welding zone along the whole joint is produced on the porous and sintered object to be welded with an even welding pressure.

The figure shows a device for welding metal conductors to fuel cell electrodes of sintered type.

A sintered porous fuel cell electrode (porosity at least 10%, preferably at least 25%) is brought between two jaws 13, 21 which are pressed together by means of a pneumatic or hydraulic servomotor 18, which can be maneuvered by means of an adjustable valve 22. A slide 14 is applied against the jaws with a metal ear 12, intended to be permanently welded to the edge of the electrode 11. The slide 14 is movable to or from the jaws 13, 21 with the help of a pneumatic or hydraulic servomotor 17 through a lever 15 and a mechanical damping device, preventing bumping. Also this servo member is manueuverable by means of an adjustable valve 23 from a pressure source 24. The valve can also be remotely controlled (from 25).

To the slide 14 and the jaws 13, 21, the electrical conductors 26 and 27 from the plates of the condenser means 19 are fastened. Here the condenser means is composed of a number of parallel connected integral condensers, connected through a converter 28 to the object to be welded. The converter 28 should be a controlled silicon converter (whose control voltage is produced in a suitable way, for example from an accumulator). It can be shunted or disconnected from the objects to be welded if they consist of good current conductors, while it should be connected to poor current conductors. The condensers 19 are connected with a secondary circuit of a transformer 30 by a circuit switch 29 through a rectifier bridge 20, connected to an A.C. network. The welding chamber is either filled with air or with protective gas from 31.

During welding the current conductors 26, 27 are connected according to the figure and the condensers are charged from the transformer.

The current switch 29 opens and the condenser 19 is discharged through the converter 28 and through the objects to be welded 11, 12 during and/or followed by pressing together (from 17) of these objects. This latter is controlled by the servo valve 23 and the pressure source 24. When the metal ear 12 is welded to the electrode edge 11 the slide 14 goes back and a new metal ear 12 is applied in it. The condenser 19 is again charged before the next welding.

In the embodiment shown the total capacitance of the condenser is =60,000—100,000 μf., the voltage is 0—200 volts.

The invention is not only applicable to fuel cell plates with metal conductors but can be applied on all kinds of porous and breakable bodies, to which metal conductors are to be welded.

I claim:
1. The method of welding metal pieces to members of porous material, at least 10% of the volume of which is a gas, said members consisting essentially of at least one substance from the group consisting of nickel, silver and aluminum, which comprises connecting a metal piece and a member in contact with such metal piece each to one of the plates of a condenser, charging said condenser and quickly discharging said condenser across said metal piece and member, and pressing said metal piece and member together with a substantially uniform pressure at the time of said discharge.

2. The method as claimed in claim 1 in which the porous member consists essentially of nickel.

3. The method as claimed in claim 1 in which the porous member consists essentially of nickel and silver.

4. The method as claimed in claim 1 in which the porous member consists essentially of nickel, silver and aluminum.

5. The method of claimed in claim 1 in which the porous member consists essentially of nickel and aluminum.

References Cited

UNITED STATES PATENTS

| | | | |
|---|---|---|---|
| 2,493,762 | 1/1950 | Klemperer | 219—113 |
| 2,880,304 | 3/1959 | Campbell | 219—107 |
| 3,287,540 | 11/1966 | Connelly | 219—118 |

RICHARD M. WOOD, *Primary Examiner.*

P. W. MAY, *Assistant Examiner.*

U.S. Cl. X.R.

178—7.87; 313—91; 350—160; 307—311